United States Patent [19]

Carioti et al.

[11] Patent Number: 4,808,668

[45] Date of Patent: Feb. 28, 1989

[54] CARBOXYLATE POLYMERS AND PROCESSES FOR THEIR PREPARATION AND USE

[75] Inventors: John V. Carioti, Baldwinsville; Richard M. Jobbins, Marcellus, both of N.Y.

[73] Assignee: Allied-Signal Inc., Morris Township, Morris County, N.J.

[21] Appl. No.: 921,825

[22] Filed: Oct. 23, 1986

Related U.S. Application Data

[63] Continuation of Ser. No. 689,212, Jan. 7, 1985, abandoned.

[51] Int. Cl.$^4$ .......................... C08F 8/30; C08F 30/04
[52] U.S. Cl. ........................ 525/329.9; 525/330.1; 525/374; 525/351.2; 525/351; 526/312; 526/240
[58] Field of Search .............. 526/240; 525/377, 329.9

[56] References Cited

U.S. PATENT DOCUMENTS

| | | | |
|---|---|---|---|
| 3,428,617 | 2/1969 | Sobolev | 260/89.5 |
| 3,707,465 | 12/1972 | Reinwald | 525/379 |
| 3,730,888 | 5/1973 | Buckman et al. | 210/52 |

*Primary Examiner*—Joseph L. Schofer
*Assistant Examiner*—Peter F. Kulkosky
*Attorney, Agent, or Firm*—Jay P. Friedenson

[57] ABSTRACT

Novel cationic, water-soluble carboxylate polymers are provided, which have a high degree of esterification. A process for making the polymers is provided by which selected quaternary salts of epoxy alkyl amine compounds are used for high conversion to ester groups, which salts have a low degradation reactivity toward the epoxy group of the esterification compound. Such a quaternary salt is glycidyl trimethyl ammonium nitrate. Processes are provided for making such quaternary salts and for use of the novel polymers for separation of water from solids, such as water from sludges.

29 Claims, No Drawings

CARBOXYLATE POLYMERS AND PROCESSES FOR THEIR PREPARATION AND USE

This application is a continuation of application Ser. No. 689,212 filed Jan. 7, 1985, now abandoned.

BACKGROUND OF THE INVENTION

This invention relates to cationic, water-soluble, polycarboxylate polymers and processes for their preparation. The polymers are useful for treatment of waste water to separate efficiently the waste from the water and for other purposes.

DESCRIPTION OF THE PRIOR ART

There is a high and increasing demand for high molecular weight, cationic polyelectrolytes for water treatment, especially for treatment of waste water. There are available certain such high molecular weight polyelectrolytes. For example, acrylic polymers have been modified by esterification to provide cationic polyelectrolyte polymers which are said to be useful for water treatment.

For example, in U.S. Pat. No. 3,730,888, certain acrylic polymers of relatively high molecular weight are described, such as sodium polyacrylates, which are reacted with certain epoxyalkylamine compounds such as glycidyl ammonium quaternary salts, to convert some of the sodium acrylate groups to the corresponding ester groups.

In previous processes, relatively low conversion of acrylate salt groups to ester groups has been realized. In an attempt to increase the conversion of acrylate groups, such as sodium acrylate groups, to ester groups, concentration of the acrylate polymer in the reaction mixture has been increased. This results in a highly viscous reaction mixture, especially as the reaction proceeds, which is difficult to stir. Also, following such previous processes using such high concentrations, the corresponding high concentrations of the epoxy compound has resulted in degradation of the epoxy compound by reaction with the anion of the reaction mixture to form, for example, the corresponding 1-halo-2-hydroxy compound, which has a much lower reactivity with the acrylate salt groups. This degradation reaction occurs at approximately neutral or acid pH values. Further, at alkaline pH values, the formation of the 1-halo-2-hydroxy by-product is reduced, but there is realized an unwanted hydrolysis of the desired acrylate ester groups. Also, by the previous processes, a less than desired amount of the acrylate groups has been converted to the hydroxyalkyl amine ester groups.

It is desired that the deficiencies of the prior art processes for esterification of the carboxylate groups of polymers and copolymers be avoided or minimized. Also, it is desired to provide more efficient carboxylate ester polymers to use in flocculation, filtration and other uses where water-solubility is required. It is further desired that the efficiencies of the process for making acrylate ester polymers be improved.

SUMMARY OF THE INVENTION

This invention relates to cationic, water-soluble, carboxylate polymers comprising the following polymeric units randomly distributed in the copolymer chain:

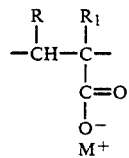

wherein R and $R_1$ are hydrogen, methyl or ethyl and $M^+$ is a cation derived from a metal;

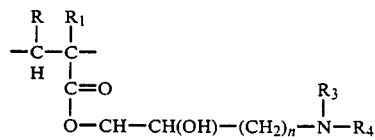

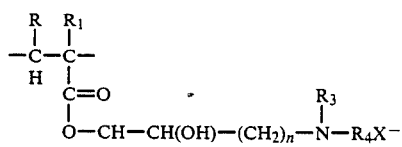

wherein R and $R_1$ are hydrogen, methyl or ethyl; $R_3$, $R_4$ and $R_5$ are alkyl groups having 1 to 8 carbon atoms, $R_2$ is selected from the group consisting of hydrogen and alkyl groups having 1 to 3 carbon atoms; "n" is an integer of 1 to 4; the total of "n" and the number of carbon atoms in $R_2$ not to exceed four; and X is an anion; the percentage of "A"

units being up to 25 mol percent and the percentage of "B" polymer units being at least 75 mol percent, based on the total mol amount of "A" and "B" units. Preferably, R is hydrogen and $R_1$ is preferably hydrogen or methyl. Preferably, $R_2$ is hydrogen. Also, it is preferred that "n" is one. It is further preferred that R and $R_1$ are hydrogen. X is an anion, suitably nitrate, sulfate, sulfonate or perchlorate.

It is preferred that the mol percentage of B polymer units be greater than 80 mol percent and it is more preferred that the mol percentage of B polymer units be at least 85 mol percent, all based on the total mols of "A" and "B" units.

The water-soluble acrylate polymers may have an amount of acrylamide polymeric units or other polymeric units so long as they do not interefere with the water-solubility of the polymers and the desired flocculation or filtration or other intended uses.

Optimum results in the process of our invention are attained by the use of polymers of ethylenically unsaturated monocarboxylic acid salts such as polysodium acrylate. The acrylate or other carboxylate salt groups are esterfied in accordance with the above formula B, suitably between about 50 to 100 mol percent, preferably from about 75 to 100 mol percent.

It has been found that a desired high esterification of the carboxylate salt groups of the polycarboxylate salt starting polymers is obtained (to provide B polymer units) by reaction with the appropriate epoxy alkyl quaternary ammonium salts, where selected salts are used which have a very low degradation reaction rate toward the epoxide groups of the quaternary salt compounds used on the esterification.

A process is provided to separate solids from water by adding to a water-solid combination a flocculating effective amount of the carboxylate polymers of this invention.

DETAILED DESCRIPTION OF THE INVENTION AND THE PREFERRED EMBODIMENTS

This invention relates to cationic, water-soluble, carboxylate polymers comprising the following polymeric units randomly distributed in the copolymer chain:

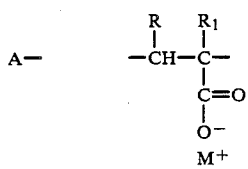

wherein R and $R_1$ are hydrogen, methyl or ethyl and $M^+$ is a cation derived from a metal;

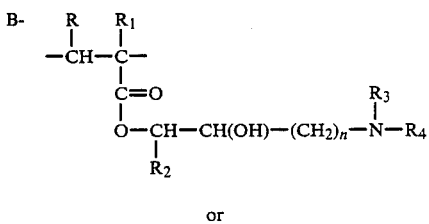

or

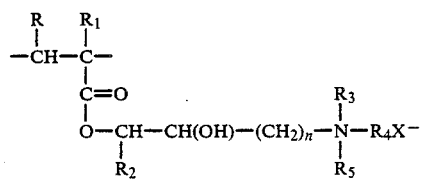

wherein R and $R_1$ are hydrogen, methyl or ethyl; $R_3$, $R_4$ and $R_5$ are alkyl groups having 1 to 8 carbon atoms, $R_2$ is selected from the group consisting of hydrogen and alkyl groups having 1 to 3 carbon atoms; "n" is an integer of 1 to 4; the total of "n" and the number of carbon atoms in $R_2$ not to exceed four; and X is an anion; the percentage of "A" units being up to 25 mol percent and the percentage of "B" polymer units being at least 75 mol percent, based on the total mol amount of "A" and "B" units. Preferably, R is hydrogen and $R_1$ is preferably hydrogen or methyl. Preferably, $R_2$ is hydrogen. Also, it is preferred that "n" is one. It is further preferred that R and $R_1$ are hydrogen. The X is an anion suitably nitrate, sulfate, sulfonate or perchlorate.

The presently most preferred B polymer unit is acryloxy-2-hydroxypropyltrimethyl ammonium salt. It is preferred that the mol percentage of B polymer units be greater than 80 mol percent and it is more preferred that the mol percentage of B polymer units be at least 85 mol percent, all based on the total mols of "A" and "B" units.

The copolymers of this invention are suitably made using a water-soluble carboxylate polymer by following the process of this invention. The water-soluble carboxylate polymers used can have a varying molecular weight, desirably at least 2,000 up to a very high molecular weight, suitably having a molecular weight of 200,000 up to at least twenty million, preferably having a molecular weight of two to twenty million, and most preferably having a molecular weight of at least five million, such as from about five to about fifteen million.

The water-soluble carboxylate polymers are desirably homopolymers, such as acrylate salt polymers, such as sodium polyacrylate. The sodium acrylate polymers can have other polymeric groups so long as they do not substantially interfere with the desired flocculation or filtration or other intended uses of the final esterified polymers. For example, the water-soluble acrylate polymers may have an amount of acrylamide polymeric units such as up to 95 mol percent acrylamide polymeric units to 100-5 mol percent acrylate salt polymeric units, preferably 0-70 mol percent acrylamide to 30-100 mol percent acrylate salt groups.

The acrylate salt unit can be replaced in part or totally with one or more of other carboxylic acid salt units such as methacrylic acid, crotonic acid, ethacrylic acid, fumaric acid, maleic acid, and itaconic acid or copolymers containing carboxylate polymer units which are derived from any of the latter ethylenically unsaturated carboxylic acids. The comonomers which may be used in preparing the applicable copolymers of these ethylenically unsaturated carboxylic acids may include other ethylenically unsaturated monomers, for example, vinyl comonomers, such as acrylonitrile, acrylamide, methyl vinyl ether, ethyl vinyl ether, the lower alkyl esters of acrylic acid and methacrylic acid, hydroxypropyl acrylate, hydroxypropyl methacrylate, hydroxyethyl acrylate, hydroxyethyl methacrylate, vinyl acetate, and vinyl alcohol, etc.

Presently preferred in the process of our invention are polymers of ethylenically unsaturated monocarboxylic acid salts such as polysodium acrylate.

The acrylate or other carboxylate salt groups are esterified in accordance with the above formula B, suitably between about 50 to 100 mol percent, preferably from about 75 to 100 mol percent. The degree of conversion to esters of formula B depends on the intended use of the polymers of the invention, and on the amount of any other comonomers employed and other factors, so long as there is not interference with the water-solubility of the final polymers.

The polymers of the invention can be made by the process provided hereby. It has been found that a very high degree of esterification can be provided by esterifying the carboxylate salt polymers with epoxy alkyl tertiary amine compounds or their quaternary salts, such as preferably the glycidyltrialkylquaternary ammonium salts as defined. The quaternary salts have a formula as follows:

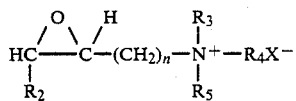

wherein X represents an anion which has low degradation reactivity against the epoxy group of the compound. $R_2$, $R_3$, $R_4$ and $R_5$ have the same definitions as set forth above.

The degradation reactivity of the anion X is determined in aqueous solution at about 25° C. using a concentration of glycidyl trimethyl ammonium salt of 0.1 molar and a 2 molar concentration of the anion X being tested for degradation reaction rate. The pH of the aqueous solution is maintained at substantial neutrality (about pH 6–7). There is a slight degradation of activity of the epoxide group by water and that activity is taken as the standard and given the degradation reactivity rate of "1". The reactivity rates of some representative anions are given in the following table:

| Anion (X$^-$) | Relative Reaction Rate Toward Glycidyl Trimethyl Ammonium Salt |
|---|---|
| Standard (H$_2$O) | 1 |
| Perchlorate | 1 |
| RSO$_3$—Sulfonate | 5 |
| NO$_3$—Nitrate | 5 |
| SO$_4$—Sulfate | 30 |
| Chloride | 300 |

Preferable anions for the epoxy alkyl quaternary ammonium salts used include perchlorate, nitrate, sulfonate and sulfate, with perchlorate and nitrate salts presently being the most preferred.

Using the epoxy alkyl quaternary ammonium salts for the esterification, the water-soluble acrylate salt polymer is dissolved in water at relatively low concentrations. This permits efficient stirring during the esterification process. A concentration of carboxylic salt polymeric units of about 0.05 to 3 molar is suitable, with about 0.2 to 3 molar concentration being generally preferable, depending upon the molecular weight of the carboxylate polymer and the nature of the polymeric units.

The epoxy alkyl quaternary ammonium salt used will be in accordance with the above formula. The amount used will depend on the degree of esterification desired.

The reactor used preferably is closed and is equipped with an appropriate stirring mechanism. Preferably the reactor is equipped also with a pH monitoring means and a heating means. The reaction temperature ordinarily will be in the range of from about 50° C. to about 100° C.; generally speaking, a temperature of about 80° C. provides good reaction rates and good conversions.

The produced polymer having carboxy-hydroxyalkyl quaternary ammonium salt polymeric units can be isolated from the reaction mixture as by precipitation using a suitable water miscible solvent or the water-soluble polymer product can be used directly in the form of the reaction mixture. The degree of esterification can be determined by infrared analysis, for example by FT-infrared analysis. The process of this invention enables a conversion of the carboxylate salt units of at least 75 mol percent and greater, such as 80 to 90 and above mol percent.

The desired quaternary ammonium salts of the epoxyalkyltrialkylamine compounds used in the esterification process to provide the water-soluble polymers of this invention can be provided from the corresponding chloro-hydroxy alkyl salt. For example, 3-chloro-2-hydroxypropyl trimethyl ammonium chloride can be converted in a relatively rapid and economically efficient manner to desirable salts of the epoxy alkyl compounds for carrying out the esterification, such as the nitrate, perchlorate, sulfate and sulfonate salts. The process is carried out by filling an ion exchange column with a strongly basic ion exchange resin, which has exchange sites of a quaternary ammonium character. The resin is used in hydroxyl form. The quaternary ammonium salt which is to be converted, such as 3-chloro-2-hydroxypropyl trimethyl ammonium chloride, is dissolved in water. The concentration can be a suitable amount such as 10 to 25 percent, 20 percent by weight being an appropriate concentration. The ion exchange procedure is suitably carried out at ambient room temperature. The aqueous solution is passed through the column at a rate permitting the chloride ion in the quaternary complex to be replaced by hydroxyl ions. The column is then flushed with water. The effluent containing epoxyalkyl quaternary ammonium hydroxide is treated with an acid with the desired anion, for example nitric, perchloric, sulfuric or sulfonic acid. To illustrate, the effluent can be treated with 70 percent nitric acid to lower the pH to about 5. The resulting quaternary ammonium nitrate can be isolated following conventional isolation procedures or the aqueous solution itself can be used as the reaction mixture for esterification of the carboxylate salt groups of the starting polymer to be used in the esterification reaction.

The water-soluble polymers of this invention are highly charged polyelectrolytes useful in solid-liquid separation processes, especially the very high molecular weight polymers, such as those derived from the carboxylate salt intermediate polymers having molecular weight of greater than 1 million, preferably having a molecular weight of at least 5 million. The copolymers of this invention are especially useful in the dewatering of sewage sludge. They are useful in the treatment of other industrial process sludges. They can be used effectively in other flocculation and filtration processes. The polymers of this invention are also useful as retention aids in paper manufacturing and for treatment of fibrous materials.

The following examples are illustrative of the invention. The setting forth of details in the examples is not intended as limitations of the invention except as expressed in the appended claims.

EXAMPLE 1

An ion exchange column having a 125 ml. capacity is filled with a strongly basic ion exchange resin sold by Rohm and Haas Company under the designation IRA 400 resin (hydroxide form). A commercial 3-chloro-2-hydroxypropyl trimethylammonium chloride sold by the Dow Chemical Company as Dow Quat 188 is dissolved in water as a 20 percent solution. This 20 percent solution (1.07 molar) is passed through the column and the column is flushed with water. Immediately the pH of the effluent solution is lowered to 5.0 with 70 percent nitric acid. The resulting solution shows by titration to be 0.38 molar in glycidyl trimethylammonium nitrate. This solution requires no further purification for use in esterification of a carboxylate resin to make the cationic water-soluble polymers of the invention.

Other desirable quaternary ammonium salts for use in the esterification reaction can be made by using the appropriate acid in lowering the pH of the effluent such as perchloric acid, sulfuric acid and sulfonic acid. Instead of starting with 3-chloro-2-hydroxypropyl trimethylammonium chloride, other corresponding quaternary ammonium chloride salts can be used to provide other appropriate epoxy alkyl trialkylammonium salts for esterification of carboxylate salt groups to B polymeric units.

EXAMPLE 2

Into a 1000 ml. four-neck flask equipped with a thermometer, mechanical stirrer and pH probe is charged 385 g. of a 0.38 molar glycidyl trimethyl ammonium nitrate (GTAN) solution (0.148 moles). To this solution is added 7.5 grams of a dry, high molecular weight (8–9 million) poly sodium acrylate homopolymer. This solution is stirred and heated to 80° C. during which time pH is maintained at 5.75 to 6.25 with 10 percent nitric acid. Once the solution reaches 80° C., it is kept at this temperature for 6 hours. The pH is controlled at 5.75 to 6.25 throughout the reaction period.

The resulting solution is analyzed by FT—IR and shows the polymer product to have undergone 75 percent esterification of the acrylate salt groups.

EXAMPLE 3

Into a 1000 ml. four-neck flask equipped with a thermometer, mechanical stirrer and pH probe, is charged 390 g. of a previously prepared 0.38 molar glycidyl trimethyl ammonium nitrate solution. To this solution is added 11 grams of a dry, high molecular weight (5–7 million) copolymer having 65 mol percent acrylamide and 35 mol percent sodium acrylate polymeric units. The copolymer used is water soluble. This solution is stirred and heated to 80° C. during which time pH is maintained at 5.75 to 6.25 by addition of 10 percent nitric acid. The solution is maintained at 80° C. for 6 hours. The pH is controlled at 5.75 to 6.25 throughout the reaction period.

The resulting solution is analyzed by FT—IR and shows 80 percent esterification of the acrylate salt groups of the polymer to form acryloxy-2-hydroxy-propyl-trimethylammonium nitrate polymer units. The polymeric product is water-soluble.

EXAMPLE 4

The respective polymer products are evaluated for sewage sludge dewatering ability. Anaerobically digested sludge from the Syracuse Metro Waste Treatment Plant is used as the substrate.

To samples of this sludge having approximately 2.0 percent solids, are added appropriate polymer dosages (10–200 parts by weight per million parts of sludge). The sludge samples are mixed by transferring the polymer-sludge mixture from one cup to another sixteen times. The conditioned sludge is poured into a Buchner funnel fitted with a cloth filter. The filtrate column is noted at various time intervals. Normally, six polymer doses are examined for each polymer. The filtration rate (ml./min.) increases as polymer dosage is increased up to an optimum.

A water-soluble polymer made following the procedure of Example 3 derived from an acrylamide-sodium acrylate copolymer having a molecular weight of about $8 \times 10^6$ is evaluated as a flocculating agent for sewage sludge. The polymer comprises 4.5 mol percent sodium carboxylate units, 25.5 mol percent acryloxy-2-hydroxypropyl-trimethylammonium nitrate units (represents 80 mol percent esterification of the original sodium carboxylate units) and 70 mol percent acrylamide units.

Starting with the same sodium acrylate acrylamide polymer following the procedure of Example 3 except glycidyl trimethylammonium chloride is used instead of glycidyl trimethylammonium nitrate, a water-soluble polymer is obtained having 14 mol percent of sodium acrylate units, 21 mol percent of acryloxy-2-hydroxypropyl-trimethylammonium chloride units (represents only about 60 mol percent esterification of the original sodium carboxylate units) and 70 mol percent acrylamide units. It is also evaluated in a comparative manner.

The following Table summarizes the results comparing the flocculating activities of the above quaternary nitrate salt polymer of this invention (80 mol percent esterification of sodium acrylate polymer units) with the quaternary chloride salt polymer made by the prior art process (60 mol percent esterification of the sodium acrylate polymeric units):

| Polymer Used | ml. Water Collected | Time Seconds | PPM Polymer |
|---|---|---|---|
| 1. Invention Nitrate Salt Polymer - (80% sodium acrylate esterified units*) | 140 | 50 | 120 |
| 2. Polymer Made (Chloride Salt) By Prior Art Process (60% sodium acrylate units esterified*) | 45 | 50 | 120 |

*esterified polymeric units are acryloxy-2-hydroxypropyl-trimethylammonium salt units

What is claimed is:

1. A high molecular weight, cationic, water-soluble, carboxylate containing polymer comprising the following polymeric units randomly distributed in the polymer

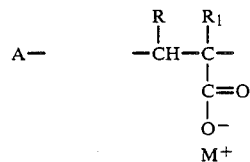

wherein R and $R_1$ are hydrogen, methyl or ethyl and $M^+$ is a cation or hydrogen, and

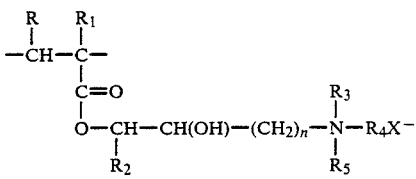

wherein R and $R_1$ are as defined above, $R_2$ is selected from the group consisting of hydrogen and alkyl groups having from 1 to 3 carbon atoms; $R_3$, $R_4$ and $R_5$ are alkyl groups having from 1 to 8 carbon atoms; n is an integer of 1 to 4, the total of n and the number of carbon atoms in $R_2$ not to exceed four, and X is an anion, the percentage of "B" polymer units being at least 50 mole percent based on the total mole amount of "A" and "B" units.

2. A polymer as defined in claim 1 wherein R is hydrogen.

3. A polymer as defined in claim 1 wherein R is hydrogen and $R_1$ is methyl.

4. A polymer as defined in claim 1 where R and $R_1$ are hydrogen.

5. A polymer as defined in claim 1, 2, 3 or 4 wherein X is nitrate, sulfate, sulfonate or perchlorate.

6. A polymer as defined in claim 4 wherein polymeric unit B is acryloxy-2-hydroxypropyltrimethyl ammonium salt.

7. A polymer as defined in claim 4 wherein the polymer unit B is acryloxy-2-hydroxypropyltrimethyl ammonium nitrate.

8. A polymer as defined in claim 4 wherein the polymeric unit b is acryloxy-2-hydroxypropyltrimethyl ammonium salt and is present in the amount of at least 80 mol percent.

9. A polymer as defined in claim 4 wherein the polymeric unit B is acryloxy-2-hydroxypropyltrimethyl ammonium salt and is present in the amount of at least 85 mol percent.

10. A polymer as defined in claim 4 wherein the polymeric unit B is acryloxy-2-hydroxypropyltrimethyl ammonium salt and is present in the amount from about 85 to about 90 mol percent.

11. A polymer as defined in claim 6, 7, 8, 9 or 10 wherein the salt is nitrate, sulfate, sulfonate or perchlorate.

12. A process for preparing a polymer of claim 1 by esterification of a water-soluble carboxylate salt polymer with an epoxy alkyl ammonium salt of the following formula:

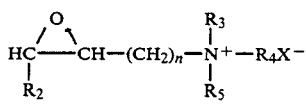

wherein X is an anion which has a low degradation reactivity against the epoxy group of said salt compound; $R_2$, $R_3$, $R_4$ and $R_5$ are as defined in claim 1; and esterification is carried out in aqueous medium at an elevated reaction temperature.

13. A process of claim 12 where X is a nitrate, sulfate, sulfonate or perchlorate.

14. A process of claim 12 wherein the ammonium salt compound is glycidyl trialkyl ammonium salt.

15. A process of claim 14 wherein the ammonium salt compound has a salt forming anion of nitrate, sulfate, sulfonate or perchlorate.

16. A polymer as defined in claim 1 wherein $R_3$, $R_4$ and $R_5$ are all methyl.

17. A polymer as defined in claim 1 wherein the conversion of the A units to the cationic ester is greater than 75%.

18. A polymer as defined in claim 1 wherein the molecular weight is from about 2,000,000-20,000,000.

19. A polymer as defined in claim 1 wherein the molecular weight is at least 5,000,000.

20. A polymer as defined in claim 1 wherein the A units are present in an amount up to 25 mol percent based on the total mol amount of A and B units.

21. A polymer as defined in claim 16 wherein the molecular weight is at least 5,000,000.

22. A polymer as defined in claim 17 wherein the molecular weight is at least 5,000.000.

23. A polymer as defined in claim 18 wherein the molecular weight is at least 5,000,000.

24. A polymer as defined in claim 21 wherein X is selected from the group consisting of perchlorate, nitrate, sulfonate or sulfate.

25. A polymer as defined in claim 22 wherein X is selected from the group consisting of perchlorate, nitrate, sulfonate or sulfate.

26. A polymer as defined in claim 23 wherein X is selected from the group consisting of perchlorate, nitrate, sulfonate or sulfate.

27. A polymer as defined in claim 26 in which $R_1$, $R_2$ and $R_3$ are all methyl.

28. A polymer as defined in claim 1 which is effective as a sludge dewatering agent.

29. A process as defined in claim 12 wherein the esterification is carried out at a pH of about 6-7.

* * * * *

Disclaimer 4,808,668 — John V. Carioti, Baldwinsville; Richard M. Jobbins, Marcellus, both of N.Y. CARBOXYLATE POLYMERS AND PROCESSES FOR THEIR PREPARATION AND USE. Patent dated Feb. 28, 1989. Disclaimer filed March 10, 1997, by the assignee, S.N.F.

Hereby enters this disclaimer to all claims of said patent.
*(Official Gazette,* April 29, 1997)